United States Patent [19]

Wada et al.

[11] Patent Number: 4,764,027
[45] Date of Patent: Aug. 16, 1988

[54] DISPLAY SEGMENT PATTERNS OF CLINICAL THERMOMETER

[75] Inventors: Yoshihiro Wada; Ryoichi Fujii; Takashi Suzuki, all of Nara, Japan

[73] Assignee: Sharp Kabushiki Kaisha, Osaka, Japan

[21] Appl. No.: 857,101

[22] Filed: Apr. 29, 1986

[30] Foreign Application Priority Data

Sep. 27, 1985 [JP] Japan .................... 60-215697

[51] Int. Cl.⁴ .................... G09F 9/46; G01K 1/02
[52] U.S. Cl. .................... 374/208; 340/756; 350/331 T; 374/183
[58] Field of Search .................... 374/183, 102, 208; 340/756, 765; 350/336, 335, 331 T

[56] References Cited

U.S. PATENT DOCUMENTS

| | | | |
|---|---|---|---|
| 3,831,166 | 8/1974 | De Nardo | 350/336 X |
| 3,897,643 | 8/1975 | Morris, Jr. et al. | 340/756 X |
| 3,903,519 | 9/1975 | Zega | 340/815.04 |
| 3,925,977 | 12/1975 | Maezawa | 340/336 X |
| 3,940,595 | 2/1976 | Turner | 340/765 X |
| 3,971,012 | 7/1976 | Morokawa et al. | 340/765 |
| 4,008,950 | 2/1977 | Chapman et al. | 340/756 X |
| 4,026,103 | 5/1977 | Ichikawa et al. | 350/160 LC X |
| 4,142,182 | 2/1979 | Kmetz | 340/756 |
| 4,309,699 | 1/1982 | Tauer | 340/715 |
| 4,443,062 | 4/1984 | Togashi et al. | 350/335 X |
| 4,447,884 | 5/1984 | Wada | 374/102 X |
| 4,536,851 | 8/1985 | Germanton et al. | 374/183 X |
| 4,565,456 | 1/1986 | Iida et al. | 374/170 X |
| 4,611,897 | 9/1986 | Hara et al. | 340/756 X |

FOREIGN PATENT DOCUMENTS 2061586  5/1981  United Kingdom .

OTHER PUBLICATIONS

Elektor, issued Jul./Aug. 1977, pp. 32-33 "Digital Display Systems".

Primary Examiner—Daniel M. Yasich
Attorney, Agent, or Firm—Birch, Stewart, Kolasch & Birch

[57] ABSTRACT

A display electrode arrangement for an electronic clinical thermometer includes two groups of segment electrodes and two groups of common electrodes, and a driving circuit for selectively driving segment signals and common signals. Each of the two groups of segment electrodes and common electrodes is operated to display only a "3" or a "4" in the Centigrade degrees, and a "9" or a "10" for the Fahrenheit degrees. Those numerals may be displayed by combining the displayed portions.

4 Claims, 7 Drawing Sheets

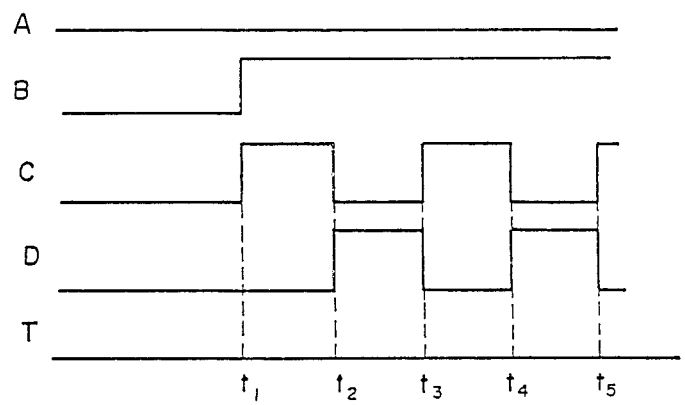
*FIG.5*
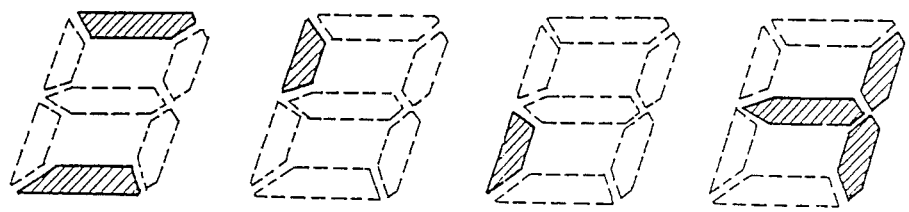
*FIG.6(a)*   *FIG.6(b)*   *FIG.6(c)*   *FIG.6(d)*

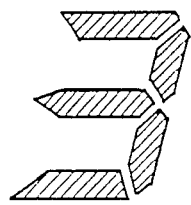
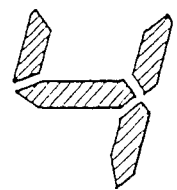
FIG.7    FIG.8
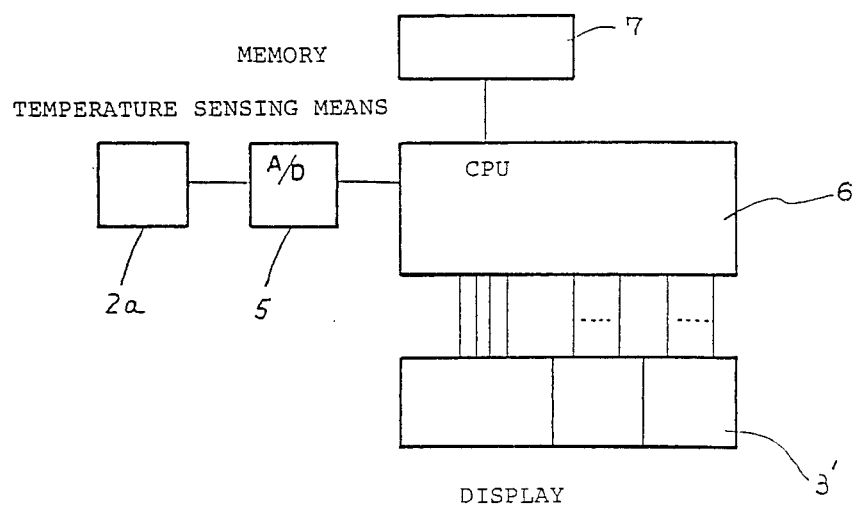
FIG.9

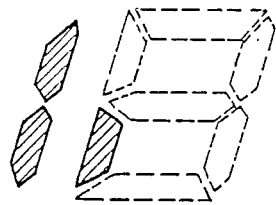 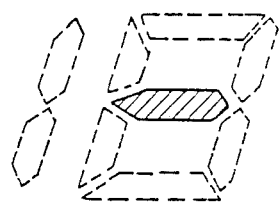 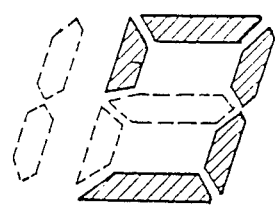
FIG.13(a)　　　FIG.13(b)　　　FIG.13(c)
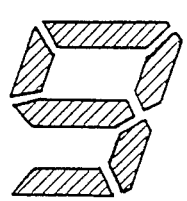　　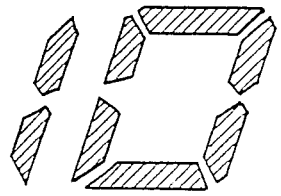
FIG.14　　　FIG.15

DISPLAY SEGMENT PATTERNS OF CLINICAL THERMOMETER

BACKGROUND OF THE INVENTION

The present invention relates to a clinical thermometer and, more particularly, to display segment patterns of an electronic clinical thermometer for displaying alphanumeric figures with various combinations of segment electrode signals and common electrode signals.

In the conventional display segments of the electronic clinical thermometer, seven segment electrode patterns forming a minus-in-square configuration are used in combination with a corresponding number of common electrodes confronting the segment electrode which are selectively illuminated to display a figure. Three or four digits of such electrode combinations are normally provided.

However, to display the temperature of the human body, it may be sufficient to display only the range of 35.0–42.0 for the Centigrade degrees and only the range of 96.8–105.8 for the Fahrenheit degrees. In this aspect, an improved pattern of the display segments is expected.

SUMMARY OF THE INVENTION

Accordingly, it is an object of the present invention to provide an improved pattern of display segments of a clinical thermometer with a minimum combination of segment electrodes and common electrodes.

It is another object of the present invention to provide an improved pattern of a clinical thermometer comprising two distinct groups of segment electrodes and two distinct groups of common electrodes, so that each of the two groups of segment electrodes and common electrodes are selectively combined for displaying either a "3" or "4" in the ten digit location in a Centigrade mode and for displaying either a "9" or "10" in the ten and hundred digit location in a Fahrenheit mode.

Briefly described, in accordance with the present invention, display segment patterns of a clinical thermometer comprises two group each of both segment electrodes and common electrodes, so that they are selectively combined to display the necessary numbers of the temperature value sensed by the thermometer.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 4 and 5 are time charts of segment and common driving signals for driving the display patterns of the embodiment;

FIGS. 6(a) to 6(d) are the possible display patterns of the present invention;

FIGS. 7 and 8 are the figures displayed by the present invention;

FIG. 9 is a block diagram of the electronic clinical thermometer according to a second preferred embodiment of the present invention;

FIGS. 13(a), 13(b), and 13(c) are the display patterns formed by the display of the second preferred embodiment of the present invention; and FIGS. 14 and 15 are the figures displayed by the embodiment of the second preferred present invention.

DESCRIPTION OF THE PREFERRED EMBODIMENTS

Figure 1:
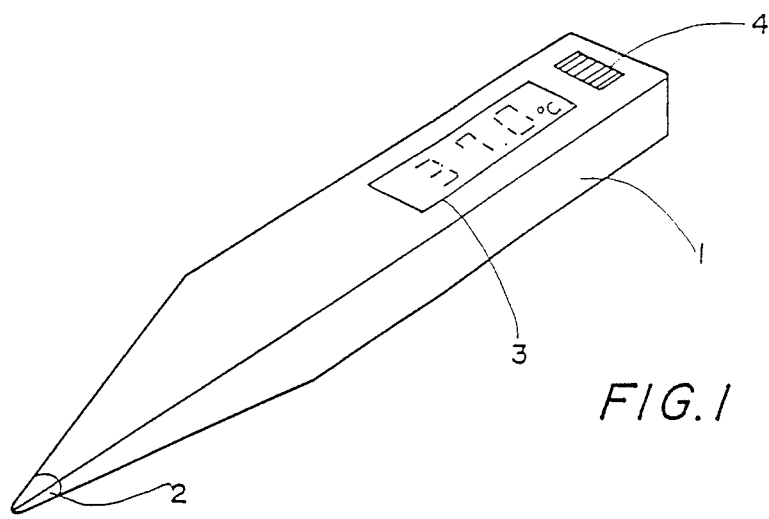
FIG. 1 is a perspective view of an electronic clinical thermometer with display segment patterns according to the present invention.

FIG. 1 is a perspective view of an electronic clinical thermometer 1 of the present invention. The body of the thermometer 1 comprises a temperature sensor 2 at its tip. The temperature sensor 2 comprises a thermistor or the like for sensing the temperature. The temperature sensor 2 is directly touched with an object such as human body. A display 3 is provided for digitally displaying the temperature values detected by the sensor 2. In the first preferred embodiment of the present invention, the display 3 is to display the Centigrade degrees with two digit places and one decimal place. A power switch 4 is provided.

Figure 2:
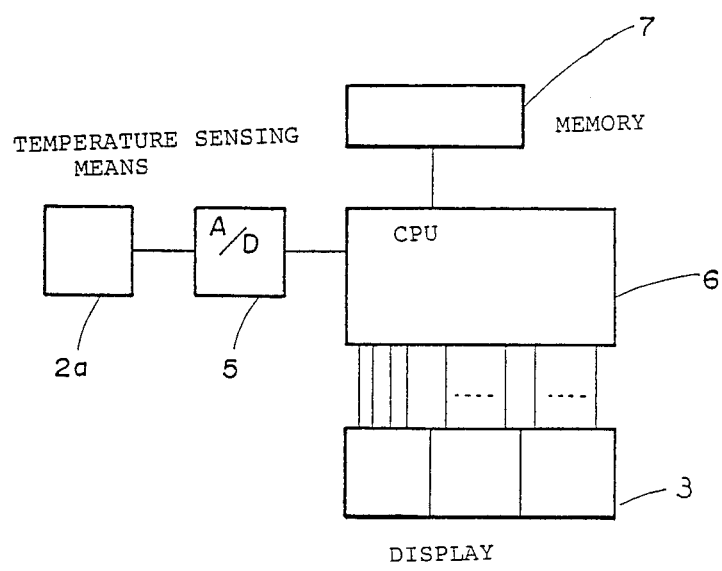
FIG. 2 is a block diagram of a circuit of the thermometer of FIG. 1.

FIG. 2 is a block diagram of a circuit of the thermometer of the present invention.

The analog signal from a temperature sensing device 2a such as a thermistor is forwarded to an A/D converter 5 to provide the corresponding digital signals. The digital signals are input to a Central Processing Unit (CPU) 6. Responsive to the input digital signals, the CPU 6 calculates temperature values. The calculation program is stored within a memory 7 such as a read only memory (ROM). The CPU 6 is operated to determine the temperature values and control the display of the measured temperature.

Figures 3A, 3B:
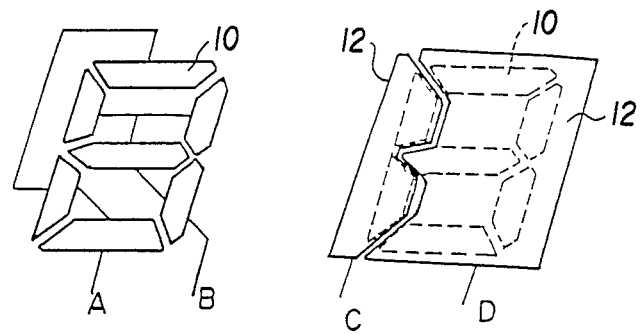
FIG. 3(a) shows segment electrodes and FIG. 3(b) shows common electrodes in hashed lines according to a first embodiment the present invention.

FIGS. 3(a) and 3(b) are segment electrodes 10 in a minus-in-square and common electrodes 12 superimposing the segment electrodes 10, respectively. The common electrodes of FIG. 3(b) are shown in broken lines. According to the present invention, the electrode patterns for the number of the ten digits to be displayed is so designed as to be either a "3" or "4" for the Centigrade degrees. As seen from FIGS. 3(a) and 3(b), the segment electrodes 10 are divided electrically into two groups according to labels A and B.

Figure 4:
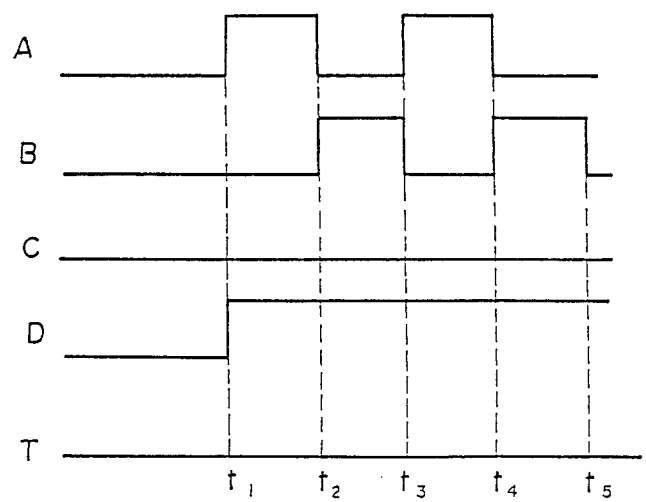

FIGS. 4 and 5 are time charts of the segment signals and common signals for driving the display patterns. The high level signals (ON) of the segment and common signals are applied to display the relevant electrodes. Once both the segment electrode and the common electrode are turned (ON), the pattern formed by the segment electrode and the common electrode is displayed. Each group of segment electrodes are displayed as either segment signal A or B of FIGS. 4 and 5.

The common electrodes 12 are also divided electrically into two groups according to labels C and D. Each group of common electrodes are displayed as a common signal C or D of FIGS. 4 and 5. The time chart of the signals of FIG. 4 is directed to displaying a "3" and that of FIG. 5 is to displaying a "4". The signals of FIGS. 4 and 5 are started at a time t1 in a time axis T.

FIGS. 6(a)-6(d) are the patterns used to display the figures. To display a "3", the display patterns of FIGS. 6(a) and 6(d) are repeated. The display pattern of FIG. 6(a) is enabled at time t1 to t2 and t3 to t4 of FIG. 4. The display pattern of FIG. 6(d) is enabled at time t2 to t3 and t4 to t5 of FIG. 4.

To display a "4", the display patterns of FIGS. 6(b) and 6(d) are repeated. The display pattern of FIG. 6(b) is enabled at time t1 to t2 and t3 to t4 of FIG. 5. The display pattern of FIG. 6(d) is enabled at time t2 to t3 and t4 to t5 of FIG. 5.

The following is a TABLE for displaying the displays of FIGS. 6(a)-6(d) with the selective combination of segment and common signals.

TABLE I

| FIG. 6 | SEGMENT SIGNAL A | SEGMENT SIGNAL B | COMMON SIGNAL C | COMMON SIGNAL D |
|---|---|---|---|---|
| (a) | ON | OFF | OFF | ON |
| (b) | OFF | ON | ON | OFF |
| (c) | ON | OFF | ON | OFF |
| (d) | OFF | ON | OFF | ON |

With the signals as summarized above, either of the figures "3" and "4" of FIGS. 7 and 8 are visualized.

According to a second preferred embodiment of the present invention, the display of the electronic clinical thermometer is for use with Fahrenheit degrees. The Fahrenheit degrees are displayed with two or three decimal places and one period.

Figure 10A:
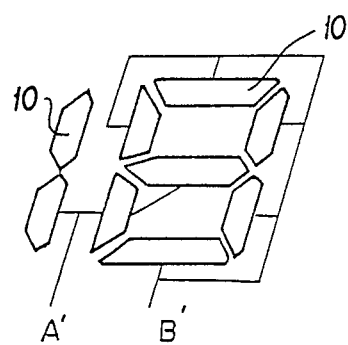
FIG. 10(a) shows the segment electrodes and FIG. 10(b) shows the common electrodes in the display of the second embodiment of the present invention.
Figure 10B:
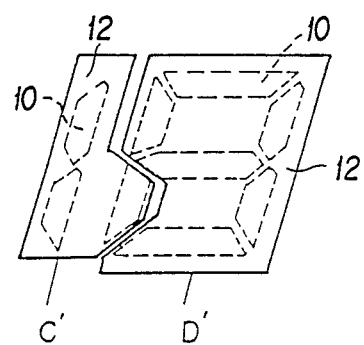

FIG. 9 is a block diagram of the thermometer, which is identical with that of FIG. 2 with the exception that a display 3' includes an electrode pattern wherein the electrode for the number of hundred and ten digits is combined as shown in FIGS. 10(a) and 10(b). FIG. 10(a) shows segment electrodes while FIG. 10(b) shows common electrodes in a broken line which correspond to the segment electrodes.

Figure 11:
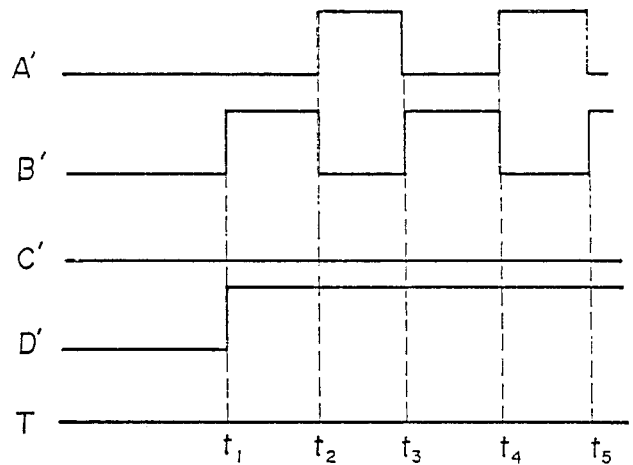
FIGS. 11 and 12 are the time charts of the segment electrode signals and common electrode signals for driving the electrode patterns of the second preferred embodiment of the present invention.
Figure 12:
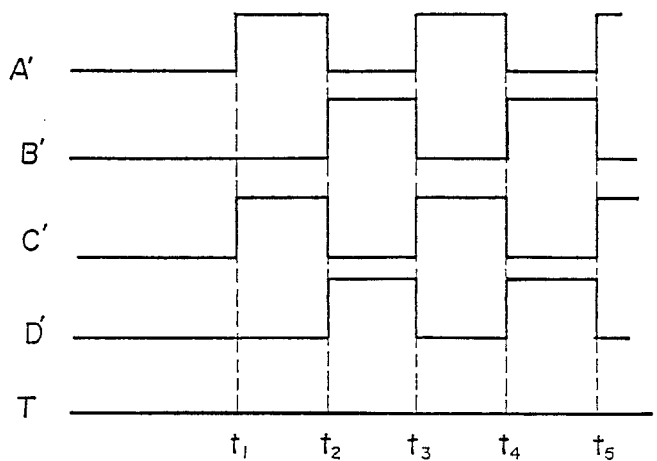

As seen from FIGS. 10(a) and 10(b), the segment electrodes 10 are electrically divided into two groups, so that each group is displayed as segment signal A' or B' of FIGS. 11 and 12. The common electrodes are also divided electrically into two groups, so that each group is displayed as common electrode signal C' or D' of FIGS. 11 and 12.

With the above-mentioned electrode configuration, the numerals "9" and "10" are displayed by the driving signals of FIGS. 11 and 12. The signals of FIGS. 11 and 12 are started from time t1 in the time axis T.

FIGS. 13(a)-13(c) are display patterns. To display the numeral "9", the display of FIGS. 13(b) and 13(c) are repeated. The display pattern of FIG. 13(b) is enabled at time t2 to t3 and t4 to t5 of FIG. 11. The display pattern of FIG. 13(c) is enabled at time t1 to t2 and t3 to t4 of FIG. 11.

To display the numeral "10" the display patterns of FIGS. 13(a) and 13(c) are repeated. The display pattern of FIG. 13(a) is enabled at time t1 to t2 and t3 to t4 of FIG. 12. The display pattern of FIG. 13(c) is enabled at time t2 to t3 and t4 to t5 of FIG. 12. The following is a TABLE of the segment signals and the common signals for enabling the display patterns of FIGS. 13(a) to 13(c).

TABLE II

| FIG. 13 | SEGMENT SIGNAL A' | SEGMENT SIGNAL B' | COMMON SIGNAL C' | COMMON SIGNAL D' |
|---|---|---|---|---|
| (a) | ON | OFF | ON | OFF |
| (b) | ON | OFF | OFF | ON |
| (c) | OFF | ON | OFF | ON |

With such signal combinations, the numerals "9" and "10" of FIGS. 14 and 15 are displayed.

When the Fahrenheit degrees are displayed, an additional electrode for displaying the symbol of "°F." may be formed.

According to the present invention, only the two segment signals and the two common signals are necessary for displaying the number at a designate tens and-/or hundreds place when a Celsius or Fahrenheit thermometer is used, respectively. The number of the total terminals can be reduced with the circuit configuration being simplified as in the present invention. Totally, the electronic clinical thermometer may be made compact and thin.

While only certain embodiments of the present invention have been described, it will be apparent to those skilled in the art that various changes and modifications may be made therein without departing from the spirit and scope of the present invention as claimed.

What is claimed is:

1. A clinical thermometer for displaying a predetermined range of Fahrenheit temperature values as decimal numbers, comprising:
    display means with separate digit positions for at least displaying the hundreds, tens, units, and tenths positions of a decimal number representative of a human body temperature being measured, each of the separate digit positions including seven segment electrodes of a minus-in-square configuration superimposed on common electrode means;
    electrical connection means for connecting the segment electrodes of the hundreds and tens positions into first and second groups of segment electrodes for each position, respectively;
    electrical connection means for connecting the common electrode means confronting the hundreds and tens positions into first and second groups of common electrode means for each position, respectively; and
    driver means for selectively driving the electrical connection means of the first and second groups of segment electrodes in combination with the electrical connection means of the first and second groups of common electrode means for each of said hundreds and tens positions, whereby a combination in the hundreds position displays a one or alternatively contains no display and the combination in the tens position displays a zero or alternatively a nine.

2. The clinical thermometer according to claim 1, wherein the first and second groups of segment electrodes and the first and second groups of superimposed common electrode means display only a part of a selected decimal number in a single driving period for each of the hundreds and tens positions.

3. A clinical thermometer for displaying a predetermined range of Celsius temperature values as decimal numbers, comprising:
    display means with separate digit positions for at least displaying the tens, units, and tenths positions of a decimal number representative of a human body temperature being measured, each of the separate digit positions including seven segment electrodes of a minus-in-square configuration superimposed on common electrode means;

electrical connection means for connecting the segment electrodes of the tens position into first and second groups of segment electrodes;

electrical connection means for connecting the common electrode means confronting the tens position into first and second groups of common electrode means;

driver means for selectively driving the electrical connection means of the first and second groups of segment electrodes in combination with the electrical connection means of the first and second groups of common electrode means for the tens position, whereby the combination in the tens position displays a three or, alternatively, displays a four.

4. The clinical thermometer according to claim 3, wherein the first and second groups of segment electrodes and the first and second groups of superimposed common electrode means display only part of a selected decimal number in a single driving period for the tens position.

* * * * *